United States Patent
Horchheimer et al.

(10) Patent No.: US 11,137,030 B2
(45) Date of Patent: Oct. 5, 2021

(54) COATING METHOD FOR BEARING RING

(71) Applicant: Aktiebolaget SKF, Gothenburg (SE)

(72) Inventors: Ralph Horchheimer, Frensdorf (DE); Gregor Schnabl, Ernsthofen (AT)

(73) Assignee: AKTIEBOLAGET SKF, Gothenburg (SE)

( * ) Notice: Subject to any disclaimer, the term of this patent is extended or adjusted under 35 U.S.C. 154(b) by 388 days.

(21) Appl. No.: 15/798,543

(22) Filed: Oct. 31, 2017

(65) Prior Publication Data
US 2018/0128317 A1    May 10, 2018

(30) Foreign Application Priority Data
Nov. 7, 2016 (DE) .......................... 102016221757.7

(51) Int. Cl.
*F16C 33/64* (2006.01)
*F16C 33/62* (2006.01)

(52) U.S. Cl.
CPC .............. *F16C 33/62* (2013.01); *F16C 33/64* (2013.01); *F16C 2206/04* (2013.01); *F16C 2223/60* (2013.01); *F16C 2223/70* (2013.01); *F16C 2240/60* (2013.01)

(58) Field of Classification Search
CPC .......... F16C 33/58; F16C 33/62; F16C 33/64; C23C 22/00; C23C 22/60; C23C 22/62; B05D 5/12
See application file for complete search history.

(56) References Cited

U.S. PATENT DOCUMENTS

| | | | | |
|---|---|---|---|---|
| 3,924,906 A * | 12/1975 | Kitaoka | ................. | H01B 17/62 384/476 |
| 5,150,974 A * | 9/1992 | Tamada | ................. | F16C 33/62 384/463 |
| 6,260,383 B1 * | 7/2001 | Warren | ................. | A44C 9/00 63/15 |
| 2004/0066997 A1 * | 4/2004 | Inukai | ................. | C23C 4/02 384/476 |

* cited by examiner

*Primary Examiner* — Nathan H Empie
(74) *Attorney, Agent, or Firm* — J-Tek Law PLLC; Scott T. Wakeman; Mark A. Ussai

(57) ABSTRACT

A method of producing a bearing ring of a rolling element bearing. External surfaces of the bearing ring are provided with an electrically insulating coating. The method providing the steps of (i) providing a prefinished bearing ring made of bearing steel. The bearing ring has a hardened and machined raceway surface for accommodating at least one row of rolling elements; (ii) providing a first coating on all surfaces of the bearing ring; (iii) removing the first coating from the external surfaces of the bearing ring; and (iv) providing the electrically insulating coating on the external surfaces.

18 Claims, 2 Drawing Sheets

COATING METHOD FOR BEARING RING

CROSS-REFERENCE

This application claims priority to German patent application no. 102016221757.7 filed on Nov. 7, 2016, the contents of which are fully incorporated herein by reference.

TECHNOLOGICAL FIELD

The present invention relates to a method of manufacturing a bearing ring comprising different coatings on different surfaces of the bearing ring.

BACKGROUND

A wide range of individual coatings can be applied to selected surfaces of a bearing ring, to provide functionality that is targeted to the demands of a specific bearing application. For example, electric motors, generators and associated equipment are at risk when electric current passes through a bearing. This can damage the contact surfaces of rolling elements and raceways in the bearing. One solution to prevent current passing through the bearing is to provide the external surfaces of one or both bearing rings with an electrically insulating coating. An example of such a process is disclosed in U.S. Pat. No. 3,924,906.

It can also be beneficial to provide a coating on the raceway surface of the ring of a rolling element bearing. The raceway experiences friction during bearing operation, due to the rolling contact between the raceway and the rolling elements. If the bearing is heavily loaded, the generated friction can lead to premature wear of the raceway. The lubricant used in such applications typically contains anti-wear additives and anti-friction additives, which can be chemically aggressive and attack the bearing steel. It is thought that such additives facilitate the diffusion of hydrogen into the raceway surface, leading to hydrogen embrittlement, cracks and early failure. One solution that has been proposed for preventing or retarding the diffusion of hydrogen into the raceway surface is to form an oxide layer on the raceway, such as disclosed, for example, in U.S. Pat. No. 5,150,974.

The provision of different coatings on different surfaces of a bearing ring enables different properties to be imparted, but the coating process can be complex. An example of dual coating process is described in U.S. Pat. No. 5,122,256. In one embodiment, a raceway surface of the bearing ring is electroplated with chromium. The ring is then cleaned with a chromium-compatible solution and the remaining surfaces of the bearing ring are provided with a zinc phosphate coating using a bath formulation with a sufficiently low acidity level that does not react with the chromium layer on the raceway.

There is still room for improvement.

SUMMARY

The present invention relates to a method of producing a bearing ring comprising an electrically insulating coating provided on external surfaces of the bearing ring. The method comprises steps of:

(i) providing a bearing ring made of bearing steel, wherein the bearing ring has a hardened and machined raceway surface for accommodating at least one row of rolling elements;

(ii) providing a first coating on all surfaces of the bearing ring;

(iii) removing the first coating from the external surfaces of the bearing ring; and (iv) providing the electrically insulating coating on the external surfaces.

After hardening, the raceway surface of a bearing ring is typically finished by grinding, to achieve the desired surface roughness and dimensional tolerances. Other machining processes for finishing the raceway include hard turning and honing. Suitably, the external surfaces of the bearing ring provided in step (i) are also subjected to a machining process such as grinding, whereby material is removed to a depth approximately equal to the thickness of the electrically insulating coating that will subsequently be provided.

The bearing ring provided in step (i) can be a bearing inner ring or a bearing outer ring of a rolling element bearing. The external surfaces of the bearing ring refer to the surfaces which do not form part of the bearing cavity, formed between opposing surfaces of the inner and outer bearings rings, when they are assembled to form the bearing. The external surfaces of the inner ring and therefore formed by the side surfaces and the bore surface of the ring. When the method of the invention is used to produce a bearing outer ring, the external surfaces are formed by the side surfaces and the outer cylindrical surface. The bearing ring may be a ring of a radial bearing, such as a deep-groove ball, an angular contact ball bearing, a double-row spherical or taper roller bearing. The bearing ring provided in step (i) may also be a ring of a thrust bearing.

In a next step (ii), the first coating is provided on all surfaces of the bearing ring. Preferably, the first coating is selected to enhance the properties of the raceway with regard to wear, friction and/or rolling contact fatigue life. The first coating may also be selected to provide corrosion protection or to provide a lubricating layer.

In one embodiment, the first coating is a conversion coating with a thickness of less than 2 μm. In a preferred example, the conversion coating is a black oxide surface layer, which is formed on the bearing ring surfaces by immersion in a bath of alkaline solution at elevated temperature. This first coating can also be a phosphate conversion coating comprising zinc phosphate, manganese phosphate or calcium-zinc phosphate.

The first coating may also be a PVD coating provided in a physical vapor deposition process. In an example, the first coating is diamond-like carbon coating.

In a further embodiment, the first coating is a CVD coating provided in a chemical vapor deposition process, such as a carbo-nitride (CNx) coating.

In a still further example, the first coating is a galvanic coating.

After the first coating has been provided on all surfaces, it is removed from the external surfaces of the bearing ring. In a preferred embodiment, the step of removal is a mechanical removal process such as shot blasting, which roughens the external surfaces of the bearing ring. This creates an excellent substrate for promoting adhesion of the electrically insulating coating, which is provided in the next method step.

In a preferred embodiment, the electrically insulating coating comprises an oxide ceramic coating with a thickness of 2-3000 μm, which is provided in a plasma spraying process. Examples of suitable materials for the oxide ceramic coating include aluminum oxide (Al2O3), which may be provided in pure form or in combination with various mass fractions of titanium oxide (TiO2) and/or chromium oxide (Cr2O3). The oxide ceramic coating may also comprise zirconium oxide (ZrO2).

Suitably, a layer of organic sealant is provided on top of the oxide ceramic coating, to seal the pores and protect against the ingress of moisture in humid operating environments. Examples of suitable sealant materials include methacrylates, epoxies, urethanes, phenolic resins, waxes and oils.

After the organic sealant has been applied, the external surfaces are typically subjected to a further machining process such as grinding, to achieve the required dimensional tolerances.

In other embodiments, the electrically insulating coating provided in step (iv) of the method is an organic coating such as a polymer coating or a resin coating.

The invention further relates to a bearing ring produced using the method of the invention and to a bearing comprising such a bearing ring.

Preferably, the bearing has a first bearing ring with an electrically insulating coating on its external surfaces and a first coating on its raceway surface and has a second bearing ring that is provided with the first coating on its raceway surface. In addition, the rolling elements of the bearing may be provided with the first coating or a second coating, which has a higher hardness than the first coating.

The finished bearing is thus not only protected against stray electrical currents that could cause electro-erosion of the bearing raceways, bearing life is further enhanced by the provision of a functional coating on the raceways. Other advantages of the invention will become apparent from the following detailed description and accompanying drawings.

BRIEF DESCRIPTION OF THE DRAWINGS

The invention will now be described in more detail for explanatory, and in no sense limiting, purposes, with reference to the following figures, in which.

DETAILED DESCRIPTION

Figure 1:
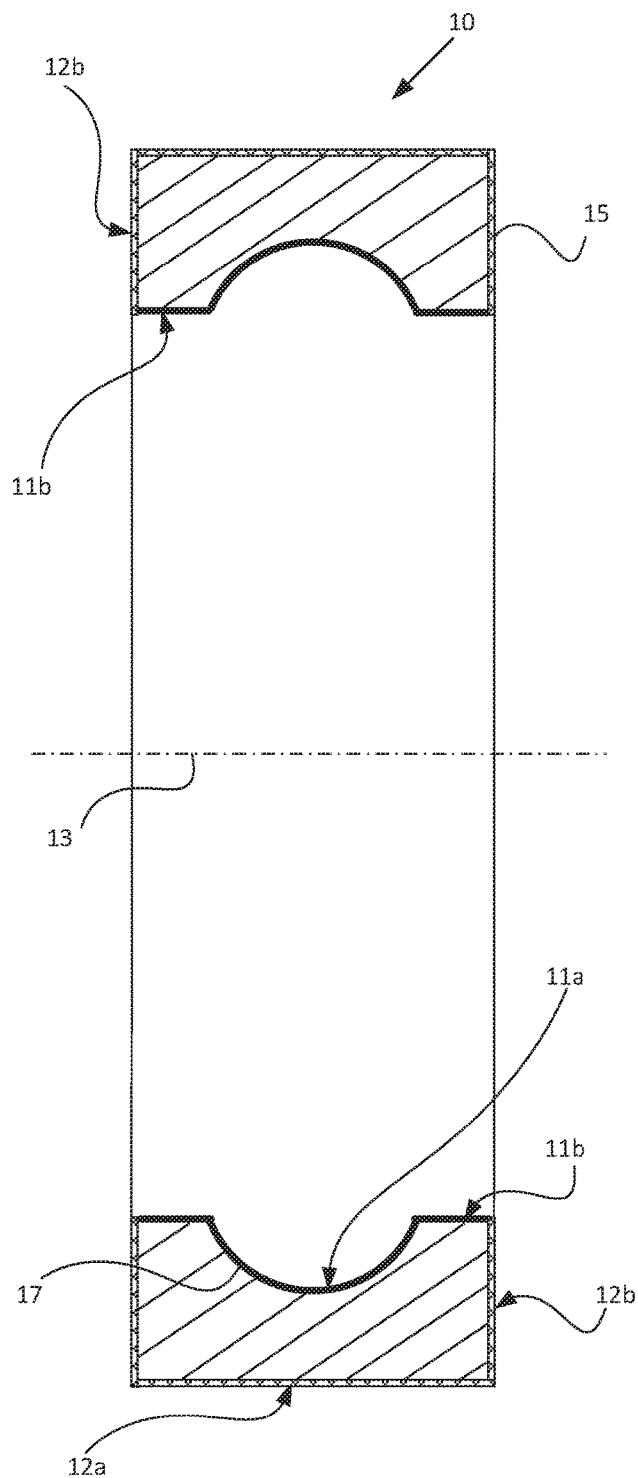
FIG. 1 shows a cross-section of a bearing outer ring comprising first and second coatings provided in accordance with the process of the invention.

An example of a bearing ring provided with two different coatings on different surfaces is shown in FIG. 1. The ring 10 is an outer ring of a deep-groove ball bearing in the depicted example, and is made of a bearing-grade steel. The ring 10 has internal surfaces, which face towards a center axis 13 of the ring. The internal surfaces consist of a raceway surface 11a, which is adapted to receive a row of balls of the bearing, and shoulder surfaces 11b at either axial side of the raceway surface 11a. Further, the ring 10 has external surfaces, consisting of an outer cylindrical surface 12a and side faces 12b at either axial side of the ring. The external surfaces 12a, 12b of the ring are provided with an electrically insulating coating 15 of aluminum oxide Al2O3 having a thickness of approximately 100 μm. The ring therefore enhances bearing life when used in e.g. a generator bearing, where there would be a risk of electrical current passing through the bearing that could damage the bearing raceways and reduce bearing life.

The service life of the bearing is further enhanced in that at least the raceway surface 11a is provided with a black oxide conversion coating 17 having a thickness of approximately 1.0 μm. The black oxide layer adds beneficial properties to bearing operation, such as an improved running-in phase, and results in equally improved surface properties after running-in, better performance under poor lubrication regimes and better lubricant adhesion, as well as enhanced smearing resistance. The risk of fretting, microspalling and crack formation can also be reduced. Furthermore, the black oxide layer offers an elementary corrosion resistance as well as an enhanced chemical resistance when compared with untreated surfaces.

Figure 2:
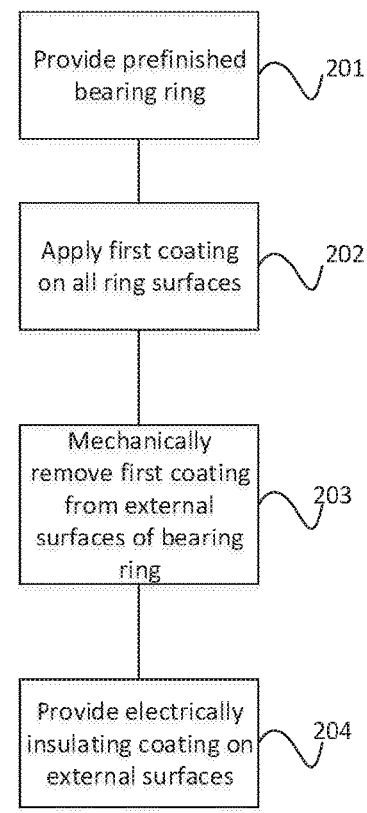
FIG. 2 is a flowchart of the process used to manufacture the bearing outer ring of FIG. 1.

The two different coatings 15, 17 are applied in the process of the invention, which is summarized by the flowchart of FIG. 2. In a first step 201, a pre-finished bearing ring made of bearing steel is provided. The pre-finished ring has a hardened raceway surface 11a which has also be ground to achieve the requisite surface roughness and dimensional tolerances. Suitably, the external surfaces 12a, 12b of the prefinished ring are machined in advance, i.e. material is removed to compensate for the 100 micron-thick electrically insulating coating 15 that will be provided on the finished bearing ring 10.

In a second step 202, all surfaces 11a, 11b, 12a, 12b of the prefinished ring are provided with the black oxide coating.

The black oxide coating 17 will typically consist of or comprise magnetite (Fe3O4). This layer may be formed by conventional means in the art, such as described in DIN 50938. In the present example, a hot blackening process is applied to form a black oxide conversion coating, whereby the prefinished ring is immersed in a bath of an alkaline aqueous salt solution (for example caustic soda and/or sodium nitrite) at a temperature of around 130° C. The duration of exposure (immersion) depends on the coating thickness required. A typical value for the thickness of the black oxide coating is from 0.5 to 2.0 μm, preferably approximately 1.0 μm, as in the example of FIG. 1.

In a third step 203, the black oxide coating 17 is mechanically removed from the external surfaces 12a, 12b of the prefinished ring. The mechanical removal may comprise grinding. In a preferred embodiment, shot blasting is applied. This has the advantage of roughening the external surfaces of the prefinished ring, which promotes adhesion of the electrically insulating coating 15. The step of mechanical removal thus prepares the substrate, without the need for further process steps.

In a fourth step 204, a layer of Al2O3 is applied to the external surfaces 12a, 12b of the prefinished ring in a plasma spraying process. The coating has a thickness of approximately 100 μm in this example, although can be up to 3000 μm thick, depending on the required resistance at the DC or AC operating voltage.

During the third and fourth steps 203, 204, the prefinished bearing ring may be supported on a shaft-like element, via the shoulder surfaces 11b of the bearing ring, so that at least the raceway surface 11a remains covered and protected. If the ring is supported on the shaft-like element over less than its full axial width, then a portion of the shoulder surfaces 11b may also be provided with the electrically insulating coating in the same way as the external surfaces 12a, 12b.

In subsequent steps of the process, a layer of organic sealant is provided on top of the aluminium oxide coating, to seal the pores and protect against the ingress of moisture in humid operating environments. Suitably, the external surfaces 12a, 12b of the ring are then subjected to a further machining process such as grinding, to achieve the required dimensional tolerances.

When the finished bearing outer ring 10 is paired with a suitable inner ring, it is beneficial if at least the raceway surface of the inner ring is provided with the same black oxide coating. The balls may also be black oxidized.

Figure 3:
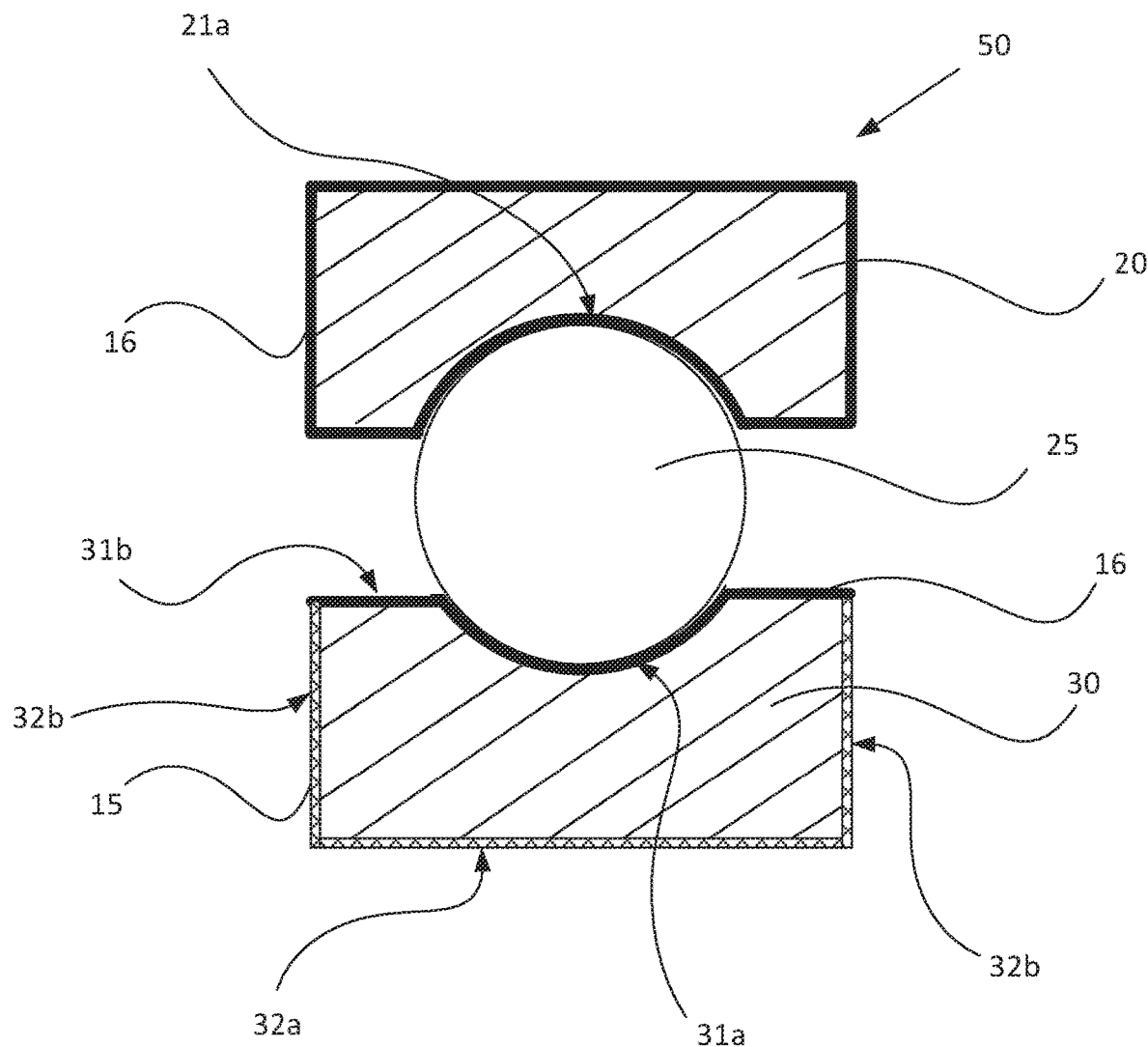
FIG. 3 is a cross-section of a bearing having an inner ring comprising first and second coatings provided in accordance with the process of the invention.

As mentioned previously, a black oxide coating on the rolling contact surfaces of a bearing is beneficial in terms of suppressing the diffusion of hydrogen into the steel and associated hydrogen embrittlement in applications where the assembled bearing is lubricated with a grease that comprises aggressive chemical additives such as anti-wear and/or extreme pressure additives. The chemical reaction that produces hydrogen would be accelerated by electrical current flowing through the bearing. Consequently, a bearing which has a black oxide coating on the inner and outer raceway surfaces and an electrically insulating coating on the external surfaces of at least one of the bearing rings provides enhanced resistance to the problem of hydrogen embrittlement and associated effects such as sub-surface cracks. One advantageous application of such a bearing is in a wind turbine, to provide better resistance to white etching cracks. An example of part of a bearing of this kind is depicted in FIG. 3, whereby the bearing has an inner ring that is manufactured using the process of the invention. The rolling elements 25 of the bearing 50 run on an on an outer raceway 21a of the outer ring 20 and on inner raceway 31a of the inner ring 30. The entire surface area of the outer ring 20 is provided with a black oxide conversion coating 16 using a method such as described above. The inner ring 30 has a black oxide coating 16 on its internal surfaces, i.e. on the inner raceway 31a and on the axially adjacent shoulder surfaces 31b. The external surfaces of the inner ring, i.e. the bore 32a and side faces 32b are provided with an electrically insulating coating 15. The process as described with respect to FIG. 2 may be applied to manufacture the inner ring 30.

In other embodiments the first coating, which is applied to all surfaces of the bearing ring and then removed from the external surfaces prior to the application of the electrically insulating coating, is a diamond-like carbon coating or carbo-nitride coating.

It should thus be understood that the invention is not restricted to the above-described embodiments, but may be varied within the scope of the following claims.

What is claimed is:

1. A method of producing a bearing ring of a rolling element bearing, external surfaces of the bearing ring being provided with an electrically insulating coating, the method comprising the steps of:
   (i) providing a prefinished bearing ring made of bearing steel, wherein the bearing ring has a hardened and machined raceway surface for accommodating at least one row of rolling elements;
   (ii) providing a first coating on all surfaces of the bearing ring;
   (iii) removing the first coating from the external surfaces of the bearing ring; and
   (iv) providing the electrically insulating coating on the external surfaces of the bearing ring; and further including, after step (ii) and before step (iii), mounting the bearing ring on a shaft such that the shaft covers the hardened and machined raceway surface.

2. The method as claimed in claim 1, wherein removing the first coating comprises a mechanical removal procedure that roughens the external surfaces of the bearing ring to form a prepared substrate for the electrically insulating coating.

3. The method as claimed in claim 1, wherein the first coating is a conversion coating.

4. The method as claimed in claim 3, wherein the first coating is a black oxide surface layer with a thickness of less than 2 µm, formed on the surfaces of the bearing ring by immersion in a bath of alkaline solution at elevated temperature.

5. The method as claimed in claim 3, wherein the first coating is a black oxide surface layer with a thickness of less than 2 µm and the electrically insulating coating is an oxide ceramic coating with a thickness of 2-3000 µm.

6. The method according to claim 5, wherein the oxide ceramic coating is selected from the group consisting of $Al_2O_3$, $TiO_2$, $Cr_2O_3$ and $ZrO_2$.

7. The method as claimed in claim 6, further comprising steps of:
   (v) providing a layer of organic sealant on top of the oxide ceramic coating; and
   (vi) machining the external surfaces of the bearing ring to achieve required dimensions.

8. The method as claimed in claim 1, wherein the first coating is a diamond-like carbon coating.

9. The method as claimed in claim 1, wherein the electrically insulating coating is an inorganic coating.

10. The method as claimed in claim 9, wherein the electrically insulating coating is an oxide ceramic coating with a thickness of 2-3000 µm, the oxide ceramic coating comprising one or more materials selected from $Al_2O_3$, $TiO_2$, $Cr_2O_3$ and $ZrO_2$.

11. The method as claimed in claim 10, further comprising steps of:
   (v) providing a layer of organic sealant on top of the oxide ceramic coating; and
   (vi) machining the external surfaces of the bearing ring to achieve required dimensions.

12. The method as claimed in claim 9, wherein the inorganic coating comprises a thermal spray coating.

13. The method as claimed in claim 1, wherein the electrically insulating coating is an organic coating.

14. The method as claimed in claim 13, wherein the organic coating comprises a polymer coating.

15. The method as claimed in claim 1, wherein the first coating is a physical vapour deposition coating or a chemical vapour deposition coating or a galvanic coating.

16. A method of producing a bearing ring of a rolling element bearing, the bearing ring having a first side including a hardened and machined raceway surface configured to rollingly support a plurality of rolling elements, a second side opposite the first side and a third side and a fourth side extending from the first side to the second side, the method comprising:
   providing a prefinished bearing ring made of bearing steel;
   forming a black oxide layer on all surfaces of the bearing ring;
   covering at least the coated, hardened and machined raceway surface;
   removing the black oxide layer from the second, third and fourth surfaces, and applying an oxide ceramic coating to the second, third and fourth surfaces.

17. The method of claim 16, wherein covering at least the coated, hardened and machined raceway surface comprises mounting the bearing ring on a shaft such that the shaft covers the coated, hardened and machined raceway surface and at least a portion of the first side spaced from the coated, hardened machined raceway surface.

18. The method of claim 17, wherein the oxide ceramic coating comprises one or more materials selected from the group consisting of $Al_2O_3$, $TiO_2$, $Cr_2O_3$ and $ZrO_2$.

* * * * *